(12) United States Patent
Hu et al.

(10) Patent No.: US 11,366,491 B2
(45) Date of Patent: Jun. 21, 2022

(54) HEAD-MOUNTED DISPLAY DEVICE

(71) Applicant: HTC Corporation, Taoyuan (TW)

(72) Inventors: Chih-Kai Hu, Taoyuan (TW); I-Hsuan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 219 days.

(21) Appl. No.: 15/813,024

(22) Filed: Nov. 14, 2017

(65) Prior Publication Data

US 2018/0321707 A1 Nov. 8, 2018

Related U.S. Application Data

(60) Provisional application No. 62/501,118, filed on May 4, 2017.

(51) Int. Cl.
*A45F 5/00* (2006.01)
*G06F 1/16* (2006.01)
(Continued)

(52) U.S. Cl.
CPC .............. *G06F 1/163* (2013.01); *A45F 5/00* (2013.01); *G02B 27/0176* (2013.01); *G02C 5/22* (2013.01); *A45F 2200/05* (2013.01)

(58) Field of Classification Search
CPC ... A41D 20/00; A42B 3/306; A45F 2005/002; A45F 2200/0508; A45F 2200/05; A45F 2200/0525; A45F 2200/0533; G02C 5/22
(Continued)

(56) References Cited

U.S. PATENT DOCUMENTS 2,159,681 A * 5/1939 Otho Wisman .......... A42B 3/14
2/416
2,418,334 A * 4/1947 Coccellato .............. A61F 9/025
2/8.2
(Continued)

FOREIGN PATENT DOCUMENTS

CN 2525546 12/2002
CN 104142580 11/2014
(Continued)

OTHER PUBLICATIONS

"Office Action of Taiwan Counterpart Application", dated Nov. 29, 2018, p. 1-p. 11.
(Continued)

*Primary Examiner* — Sally Haden
(74) *Attorney, Agent, or Firm* — JCIPRNET (57) ABSTRACT

A head-mounted display device includes a body, two extension members and an adjustable fixing member. The body is adapted to lean against a front portion of a head of the user. The two extension members are disposed opposite each other. First ends of the two extension members are respectively coupled to two opposite ends of the body and configured to rotate with respect to the body so as to lean against two side portions of the head. The adjustable fixing member is coupled to each second end of the two extension members to lean against the back portion or top portion of the head, wherein the body is fixed on the head through the two extension members and the adjustable fixing member. Each of the extension members is adapted to contact or to depart from the two side portions of the head by rotating with respect to the body.

11 Claims, 9 Drawing Sheets

(51) Int. Cl.
   *G02C 5/22*   (2006.01)
   *G02B 27/01*   (2006.01)
(58) Field of Classification Search
   USPC ..................................................... 2/181, 11
   See application file for complete search history.

(56) References Cited

U.S. PATENT DOCUMENTS

| | | | | |
|---|---|---|---|---|
| 2,587,870 | A * | 3/1952 | Marsters | G02C 5/22 351/83 |
| 2,875,447 | A * | 3/1959 | Goldmerstein | A42C 5/02 2/209.3 |
| 3,574,452 | A * | 4/1971 | McLendon | G02C 5/22 351/153 |
| 5,321,416 | A | 6/1994 | Bassett et al. | |
| 5,548,841 | A * | 8/1996 | Sherlock | A61F 9/027 2/11 |
| 6,658,664 | B1 * | 12/2003 | Verhoeven | A42B 1/22 2/12 |
| 8,959,667 | B2 | 2/2015 | Nakabayashi et al. | |
| 10,321,751 | B1 * | 6/2019 | Magrath | A45F 5/00 |
| 2012/0297520 | A1 * | 11/2012 | Gleason | A42B 3/142 2/181 |
| 2013/0021311 | A1 | 1/2013 | Watanabe et al. | |
| 2013/0306689 | A1 * | 11/2013 | Johnson | A45C 11/00 224/181 |
| 2015/0326762 | A1 * | 11/2015 | Ju | A42B 3/042 348/376 |
| 2016/0044981 | A1 | 2/2016 | Frank et al. | |
| 2016/0255748 | A1 | 9/2016 | Kim et al. | |
| 2016/0286943 | A1 * | 10/2016 | Andersen | A61F 11/12 |
| 2016/0370590 | A1 | 12/2016 | Fujishiro | |
| 2017/0090514 | A1 | 3/2017 | Byun et al. | |
| 2018/0364754 | A1 * | 12/2018 | Sullivan | G02B 27/0176 |
| 2019/0113759 | A1 * | 4/2019 | Tatsuta | A41D 20/00 |

FOREIGN PATENT DOCUMENTS

| | | |
|---|---|---|
| CN | 104662466 | 5/2015 |
| CN | 204903864 | 12/2015 |
| CN | 205054798 | 3/2016 |
| CN | 106257320 | 12/2016 |
| CN | 206039048 | 3/2017 |
| CN | 106575038 | 4/2017 |
| EP | 2597507 | 5/2013 |
| JP | H11119148 | 4/1999 |
| KR | 300228138 | 11/1998 |
| WO | 2010088296 | 8/2010 |
| WO | 2011137034 | 11/2011 |

OTHER PUBLICATIONS

"Search Report of Europe Counterpart Application", dated Oct. 18, 2018, p. 1-p. 12.
"Office Action of Europe Counterpart Application", dated Jul. 16, 2020, p. 1-p. 6.
Vuzix iWear review, retrieved from http://vrsource.com/vuzix-iwear-review-3875/.
Top 10 Best Virtual Reality Headsets of 2017, retrieved from http://heavy.com/tech/2015/07/best-vr-virtual-reality-headset-glasses-goggles-oculus-rift-specs-review/.
"Search Report of Europe Counterpart Application", dated Feb. 8, 2019, p. 1-p. 7.
"Office Action of China Counterpart Application", dated Apr. 21, 2020, p. 1-p. 7.
"Office Action of Europe Counterpart Application," dated Feb. 27, 2019, p. 1-p. 7.
"Office Action of China Counterpart Application", dated Sep. 1, 2020, p. 1-p. 6.

* cited by examiner

HEAD-MOUNTED DISPLAY DEVICE

CROSS-REFERENCE TO RELATED APPLICATION

This application claims the priority benefit of U.S. provisional application Ser. No. 62/501,118, filed on May 4, 2017. The entirety of the above-mentioned patent application is hereby incorporated by reference herein and made a part of this specification.

BACKGROUND

Field of the Invention

The application relates to a display device, and specifically relates to a head-mounted display device.

Description of Related Art

In recent years, along with developments of the industrial technology, the type, the function, and the usage method of the electronic device become more and more diversified, the wearable electronic devices which can directly worn on the body of the user appear. There are quite a few types of head-mounted electronic devices, such as eyeshield head mounted electronic device. After wearing these types of electronic devices, not only can the user see three-dimensional images, the images are also changed according to rotation of the head of the user, so as to provide more immersive experience for the user.

However, after these head mounted electronic devices are worn for a long time, the head mounted electronic device is easily shaken because of the instability of the fixing structure. In a different way, the weight distribution of the head mounted electronic device itself is not uniform so that some specific parts are pressed and the user feels uncomfortable. Otherwise, the over-complicated fixing mechanism also causes difficulty in wearing and removing the head mounted electronic device.

SUMMARY

The application provides a head-mounted display device able to tightly fit the user and to improve wearing comfort.

A head-mounted display device of the application includes a body, two extension members and an adjustable fixing member. The body is adapted to lean against a front portion of a head of the user. The two extension members are disposed opposite each other, wherein first ends of the two extension members are respectively coupled to two opposite ends of the body and configured to rotate with respect to the body so as to lean against two side portions of the head of the user. The adjustable fixing member is coupled to each second end of the two extension members to lean against the back portion or top portion of the head of the user, wherein the body is fixed on the head of the user through the two extension members and the adjustable fixing member. Each of the two extension members is adapted to contact or depart from the two side portions of the head by rotating with respect to the body.

Based on the above, in the embodiments of the application, the body of the head-mounted display device leans against the head of the user through the two extension members and the adjustable fixing member, and thus the body can be tightly fit the head of the user. The two extension members are disposed opposite each other and can be adapted to contact with or depart from the two side portions of the head of the user by rotating with respect to the body, so that the head-mounted display device can lean against the head of the user, so as to improve the comfort in wearing. Otherwise, the user can simply pull and rotate the two extension members to wear or remove the head-mounted display device, so as to improve the convenience of wearing or removing the head-mounted display device.

In order to make the aforementioned and other features and advantages of the invention more comprehensible, embodiments accompanying figures are described in detail belows.

DESCRIPTION OF THE EMBODIMENTS

Figure 1:
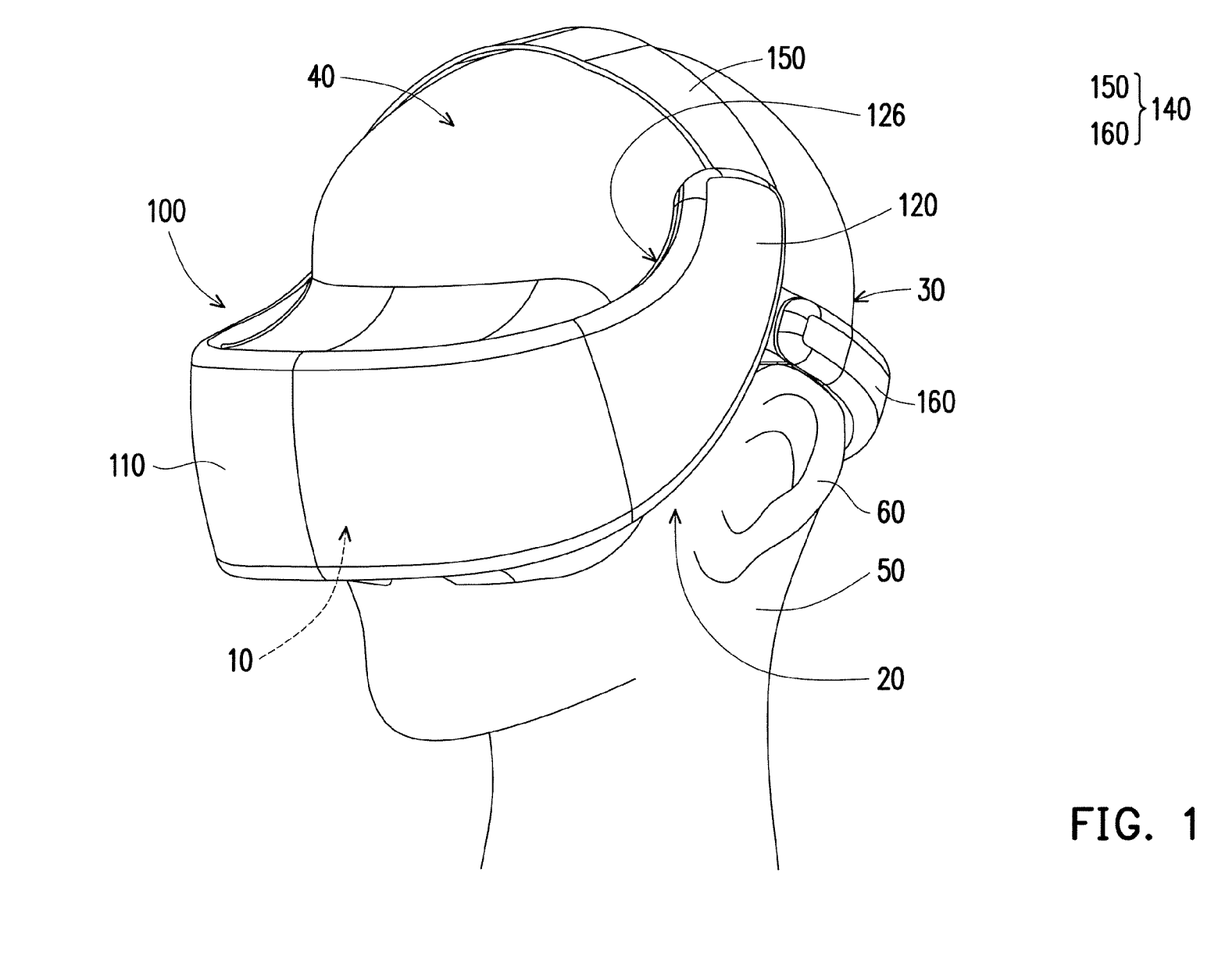
FIG. 1 is a three-dimensional schematic view depicting a head-mounted display device ill an embodiment of the invention.
Figure 2:
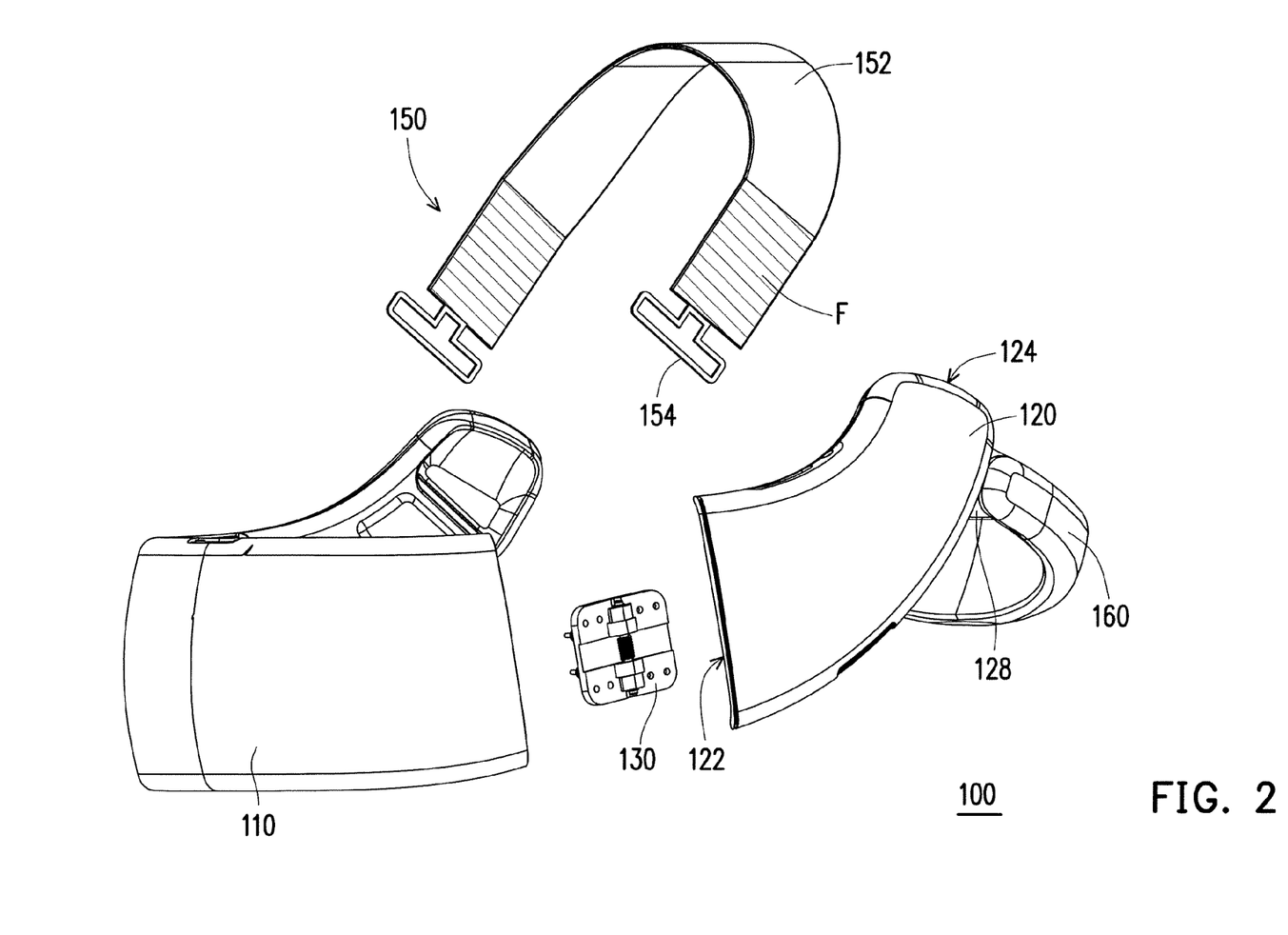
FIG. 2 is a three-dimensional assembly schematic view depicting the head-mounted display device in FIG. 1.

FIG. 1 is a three-dimensional schematic view depicting a head-mounted display device in an embodiment of the invention. FIG. 2 is a three-dimensional assembly schematic view depicting the head-mounted display device in FIG. 1. Referring to FIG. 1 and FIG. 2, in the present embodiment, a head-mounted display device 100 includes a body 110, two extension members 120 and an adjustable fixing member 140. The body 110 is adapted to lean against a front portion 10 of a head 50 of the user. In the present embodiment, the body 110 may include a display (not shown) and a circuit board (not shown), for example. The types of the display and the circuit board may be adopted according to whether the head-mounted display device 100 is applied to virtual reality system, augmented reality system, or mixed reality system, the application is not limited thereto.

Figure 3:
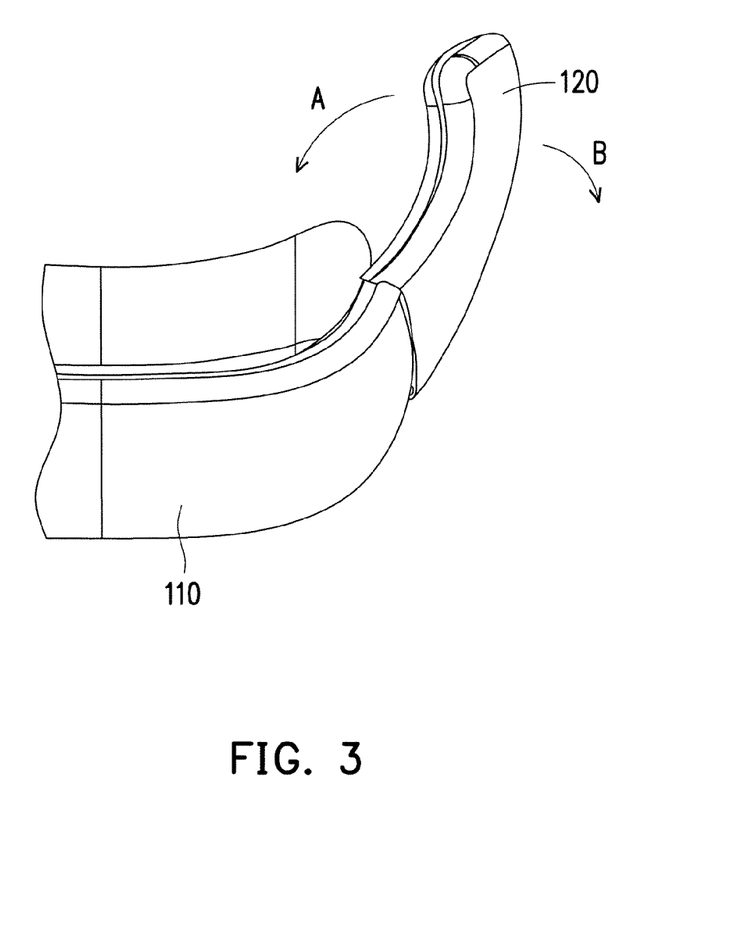
FIG. 3 is a partial three-dimensional schematic view depicting the head-mounted display device in FIG. 1 at another angle.
Figure 4:
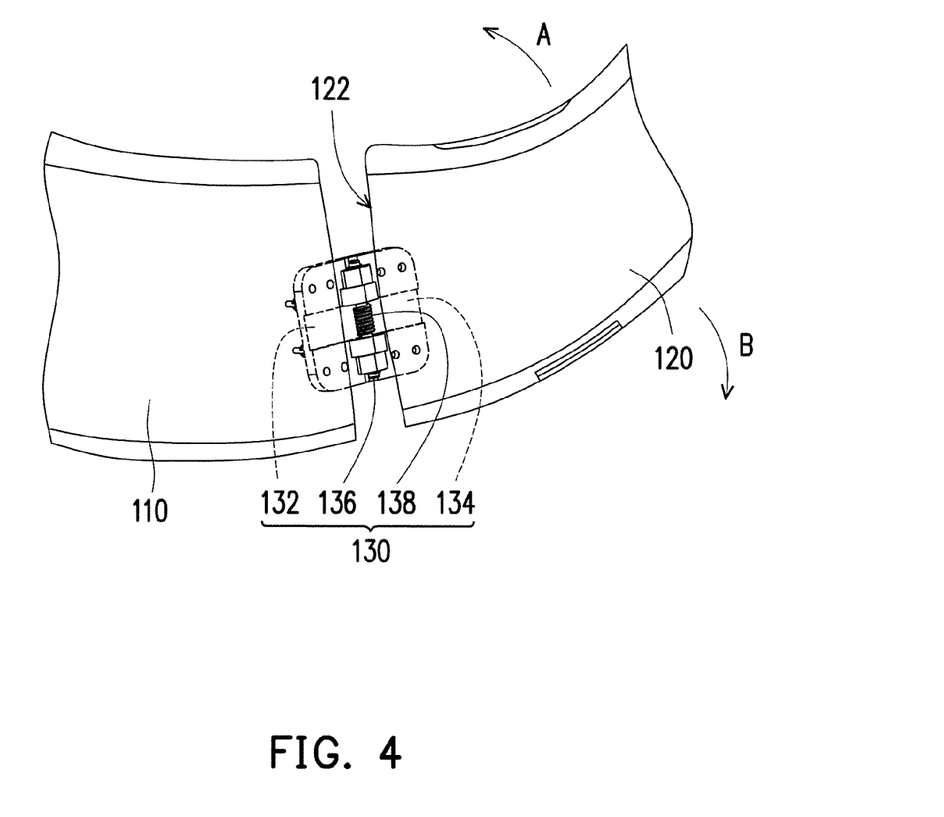
FIG. 4 is a partial three-dimensional schematic view depicting a extension member in FIG. 3 at another angle.

FIG. 3 is a partial three-dimensional schematic view depicting the head-mounted display device in FIG. 1 at another angle. FIG. 4 is a partial three-dimensional schematic view depicting a extension member in FIG. 3 at another angle. Referring to FIGS. 1-4 simultaneously, in the present embodiment, the two extension members 120 are disposed opposite each other, and first ends 122 of the two extension members 120 are respectively coupled to two opposite ends of the body 110 and configured to rotate with respect to the body 110 so as to lean against two side portions 20 of the head 50 of the user. Each of the two extension members 120 is adapted to contact or to depart from the two side portions 20 of the head 50 of the user by rotating with respect to the body 110.

To be more specific, the first ends 122 of the two extension members 120 are pivotally connected to two ends, which extends at two sides of the head 50 of the user, of the body 110, respectively. Therefore, each of the two extension members 120 can rotate in first direction A or second direction B through the joint at the corresponding end of the body 110, so as to adjust the relative position between the two extension members 120 and the body 110, as shown in FIG. 3. In other words, the user can pull the two extension members 120 to change the relative angle between the two extension members 120 and the body 110, so that the two extension members 120 contact with or depart from the two side portions 20 of the head 50 of the user.

For example, if the two extension members 120 rotate in the first direction A, the two extension members 120 will lean against the two side portions 20 of the head 50 of the user, so as to fix the body 110 to lean against the front portion 10 of the head 50 of the user. If the two extension members 120 rotate in the second direction B, the two extension members 120 will depart from the two side portions 20 of the head 50 of the user, so as to release the body 110 from the front portion 10 of the head 50 of the user in order to remove the head-mounted display device 100. As a result, the user can conveniently wear or remove the head-mounted display device 100 by rotating the two extension members 120. Simultaneously, the user can also slightly adjust the angle of the two extension members 120 so as to adjust the degree of tightness at two sides of the head-mounted display device 100, so that the two extension members 120 can be in close contact with the two side portions 20 of the user while improving the comfort in wearing.

Moreover, it is worth mentioning that, in the present embodiment, the two extension members 120 are curved and extended from two opposite ends of the body 110 to above the ears 60 of the user, so as to prevent the two extension members 120 from pressing the ears 60. To be more specific, in the present embodiment, the two extension members 120 are curved structures, and an inner arc portion 126 of the curved structures faces a top portion 40 of the head 50 of the user and is located between the top portion 40 and the ears 60 of the head 50 of the user. In other words, the curved structures of the two extension members 120 in the present embodiment are designed to meet human engineering design criteria and are extended diagonally toward the top portion 40 before reaching the ears 60 so that the two extension members 120 avoid the ears 60. Therefore, the degree of comfort when the user wears the head-mounted display device 100 is increased. Otherwise, in other embodiments, other auxiliary electronic devices are also equipped because the two extension members 120 are curved structures extended above the ears 60, the auxiliary electronic devices may be earphone or other electronic accessories, for example, so as to add more functions to the head-mounted display device 100, but the application is not limited thereto.

Besides, in the present embodiment, the head-mounted display device 100 further includes two pivot members 130 that respectively connecting the two opposite ends of the body 110 with the first ends 122 of the two extension members 120. In addition, the two extension members 120 are configured to rotate with respect to the body 110 through the two corresponding pivot members 130 so as to contact with or depart from the two side portions 20 of the head 50 of the user. As a result, the body 110 can be fixed on or removed from the front portion 10 of the head 50 of the user, so as to adjust the degree of tightness between the two extension members 120 and the two side portions 20 of the head 50 of the user.

For example, in the present embodiment, each pivot member 130 includes a first connecting portion 132, a second connecting portion 134, and a shaft 136. The first connecting portion 132 is fixed on the body 110, and the second connecting portion 134 is fixed on the corresponding extension member 120. Therefore, the second connecting portion 134 can rotate with respect to the first connecting portion 132 via the shaft 136, so that the extension member 120 is turned in a direction close to or away from the head 50 of the user, as shown in FIG. 4. The type, material, and appearance of the two pivot members 130 may be designed according to the appearance of the body 110 and the two extension members 120, but the application is not limited thereto. For example, in the present embodiment, a spring member 138 may be additionally sleeved on the shaft 136, so the second connecting portion 134 can be rotated in the first direction A by the elastic force of the spring member 138 and thus the two extension members 120 tightly lean against the head 50 of the user, in order to enhance the stability of the body 110 fixed on the head 50 of the user, but the application is not limited thereto.

Figure 5:
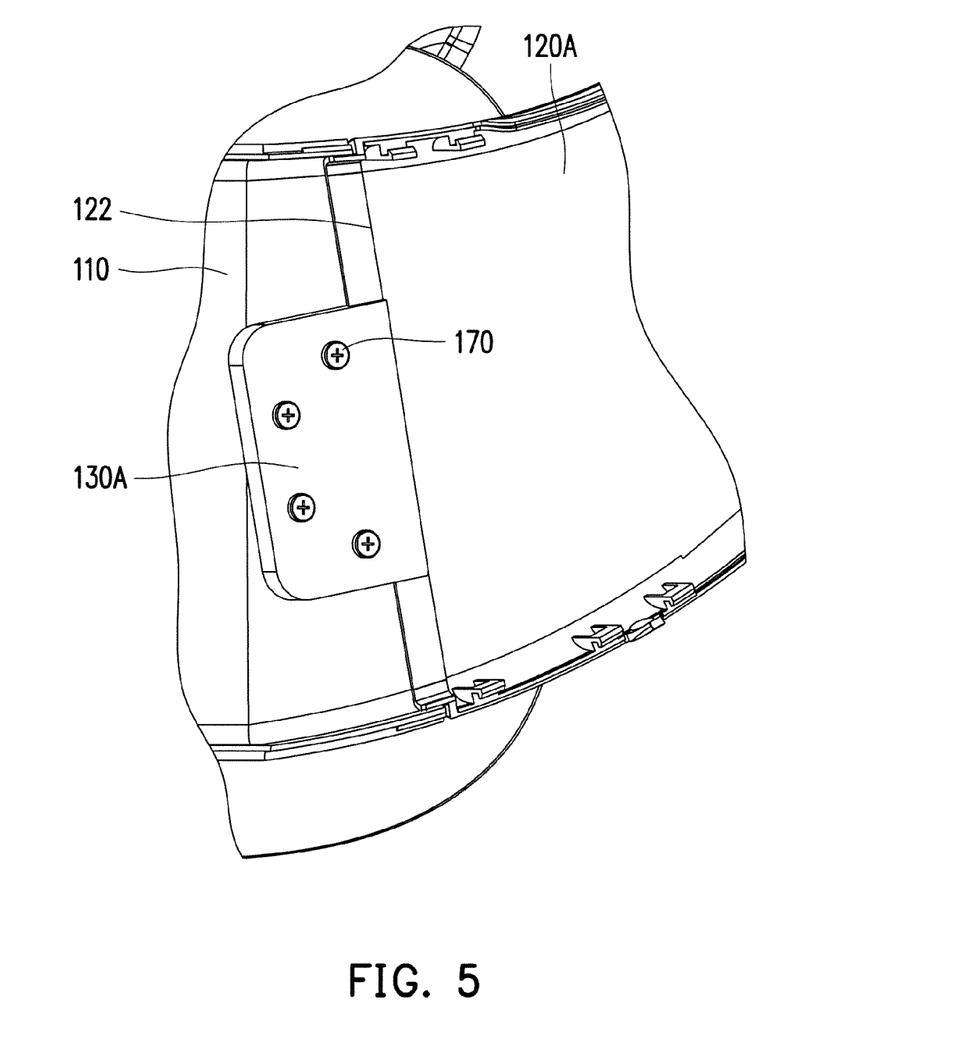
FIG. 5 is a three dimensional view depicting an extension member in another embodiment of the invention.

FIG. 5 is a three dimensional view depicting an extension member in another embodiment of the invention. For convenience of explanation, a part of the case of the extension member 120A is hidden to show the elastic member 130A in FIG. 5. Referring to FIG. 1 and FIG. 5 simultaneously, in the embodiment of FIG. 5, the first ends 122 of the two extension members 120A are respectively coupled to the two opposite ends of the body 110 by screwing method. For example, in the present embodiment, each extension member 120A includes an elastic member 130A fixed to corresponding one of two opposite ends of the body 110. In the embodiment of FIG. 1, the extension member 120 having the pivot member 130 can be selectively replaced by the extension member 120A of the present embodiment, so that the first ends 122 of the two extension members 120A are respectively coupled to two opposite ends of the head-mounted display device 100 and configured to rotate with respect to the body 110. That is, in the present embodiment, the extension member 120A rotates relative to the body 110 by the elastic member 130A.

To be more specific, the two elastic members 130A are respectively connected to the first ends 122, and a plurality of fixing elements 170 of the head-mounted display device 100 are fixed to two opposite ends of the body 110. The fixing elements 170 may be screws, for example, and the elastic members 130A are formed by elastic material, such as plastic, but the application is not limited thereto. As a result, each of the two extension members 120A can rotate with respect to the body 110 by bending the corresponding elastic member 130A.

Moreover, without applying force, the bent elastic member 130A can be restored to the original shape. For example, when wearing, the user applies force on the extension member 120A so one of the elastic members 130A is bent, in order to wear the body 110 on the front portion 10 of the head 50 of the user. Before complete wearing, the elastic member 130A is restored to the original shape by ending the application of force, so that the two extension members 120A contact the two side portions 20 of the head 50 of the user so as to fix the head-mounted display device 100. Therefore, the convenience of wearing and removing the head-mounted display device 100 is improved.

An embodiment of the adjustable fixing member 140 is described hereinafter and is selectively applied to the head-mounted display device 100 in FIG. 1 or FIG. 5 according to requirements of the user. The following paragraphs are directed to the application to the head-mounted display device 100 in FIG. 1, but the application is not limited thereto.

On the other hand, referring to FIG. 1 and FIG. 2 simultaneously, the adjustable fixing member 140 is coupled to each second end 124 of the two extension members 120 to lean against the back portion 30 or the top portion 40 of the head 50 of the user, wherein the body 110 is fixed on the head 50 of the user through the two extension members 120 and the adjustable fixing member 140. In other words, the two extension members 120 connect the body 110 with the adjustable fixing member 140, and the adjustable fixing member 140 makes the adjustable fixing member 140, the two extension members 120, and the body 110 lean against the head 50 of the user at the same time. As a result, the head-mounted display device 100 can tightly fit the user.

To be more specific, in the present embodiment, the adjustable fixing member 140 may include a top side adjustable fixing member 150 and a back side adjustable fixing member 160. The top side adjustable fixing member 150 is adapted to contact the top portion 40 of the head 50 of the user, and two opposite ends of the top side adjustable fixing member 150 are respectively coupled to the second ends 122 of the two extension members 120; and As a result, when the user wears the head-mounted display device 100, the top side adjustable fixing member 150 leans against the top portion 40 of the head 50 of the user to prevent the body 110 and the two extension members 120 from sliding downwards due to gravity.

More specifically, in the present embodiment, the top side adjustable fixing member 150 includes a bearing belt 152 and two buckles 154, the buckles 154 respectively connect two opposite ends of the bearing belt 152 with the two extension members 120, and the bearing belt 152 has elastic portions F. In other words, the two ends of the top side adjustable fixing member 150 have the buckles 154 configured to respectively buckle to the two extension members 120, the user can adjust the total length of the body 110, the two extension members 120, and the top side adjustable fixing member 150 by adjustably buckling the two buckles 154 to the positions on the two corresponding extension members 120, so that the head-mounted display device 100 can be adjusted to fit different users.

In addition, since the two buckles 154 of the top side adjustable fixing member 150 are buckled to the two corresponding extension members 120, the user can easily assemble the top side adjustable fixing member 150 or detach the top side adjustable fixing member 150 from the two extension members 120, so as to replace, adjust, or clean the top side adjustable fixing member 150. The type, material, and shape of the two buckles 154 may be designed according to the buckling structure (not shown) of the two extension members 120, but the application is not limited thereto. It is worth mentioning here, the elastic portion F of the bearing belt 152 is a rubber band or an elastic band, for example, which is formed by elastic material, and the elastic portion F can be directly or indirectly formed on an inelastic part of the bearing belt 152 depending on situations. Alternatively, the bearing belt 152 can be directly formed by elastic material, the application is not limited thereto. As a result, the user can simply pull the top side adjustable fixing member 150 to conveniently wear or remove the head-mounted display device 100, so as to improve the convenience of wearing the head-mounted display device 100. Simultaneously, the elastic material has the properties to improve the comfort of the user in wearing the head-mounted display device 100.

Figure 6:
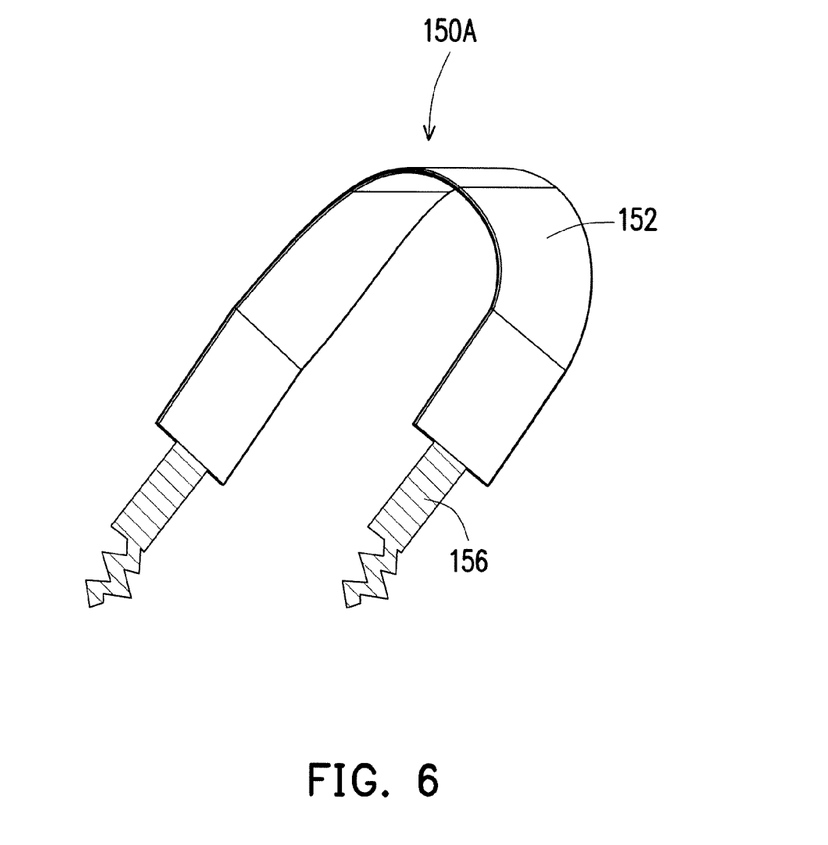
FIG. 6 is a three dimensional view depicting a top side adjustable fixing member in another embodiment of the invention.

FIG. 6 is a three dimensional view depicting a top side adjustable fixing member in another embodiment of the invention. Referring to FIG. 6, the top side adjustable fixing member 150A of the present embodiment is similar to the top side adjustable fixing member 150 shown in FIG. 2. The main differences are that, in the present embodiment, the top side adjustable fixing member 150A includes a bearing belt 152 and two elastic connecting belts 156. In other words, the elastic connecting belts 156 replace the buckles 154 in the present embodiment. The elastic connecting belt 156 is formed by elastic material or is a structure having string, for example. The elastic connecting belts 156 connect two opposite ends of the bearing belt 152 with the second ends of the two corresponding extension members (such as the second ends 124 of the two extension members 120 shown in FIG. 2), respectively. The bearing belt 152 can be pulled and moved relative to the two extension members because of the elasticity of the two elastic connecting belts 156. Therefore, the user can also fix the body (such as the body 110 shown in FIG. 2) because the bearing belt 152 leans against the top portion of the head of the user (such as the top portion 40 of the head 50 of the user). In other words, when using the head-mounted display device 100, the user can conveniently wear the head-mounted display device 100 by simply pulling the top side adjustable fixing member 150A away from the head of the user. After finished using the head-mounted display device 100, the user can simply pull the top side adjustable fixing member 150A away from the head of the user to conveniently remove the head-mounted display device 100. As a result, the convenience of wearing and removing the head-mounted display device 100 is improved.

An embodiment of the back side adjustable fixing member 160 is described next, please continue to refer FIG. 1 to FIG. 4. In the present embodiment, the back side adjustable fixing member 160 is adapted to contact the back portion 30 of the head 50 of the user, and two opposite ends of the back side adjustable fixing member 160 are respectively coupled to the second ends 124 of the two extension members 120. To be more specific, the two opposite ends of the back side adjustable fixing member 160 are respectively connected and fixed to protrusions 128 of the two corresponding extension members 120. As a result, when the user wears the head-mounted display device 100, the back side adjustable fixing member 160 leans against the back portion 30 of the head 50 of the user to prevent the body 110 and the two extension members 120 from sliding downwards due to gravity and to fix the position of the body 110 on the front portion 10 of the head 50 of the user.

Figure 7A:
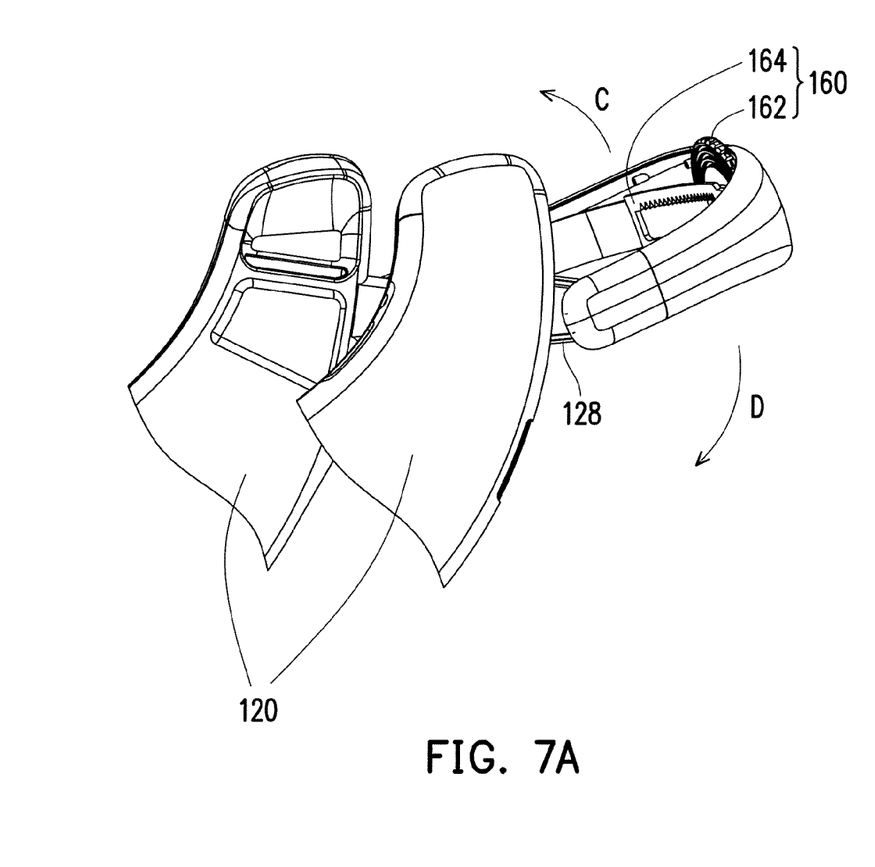
FIG. 7A and FIG. 7B are three-dimensional schematic views depicting the back side adjustable fixing member at retracted state and stretched state, respectively.
Figure 7B:
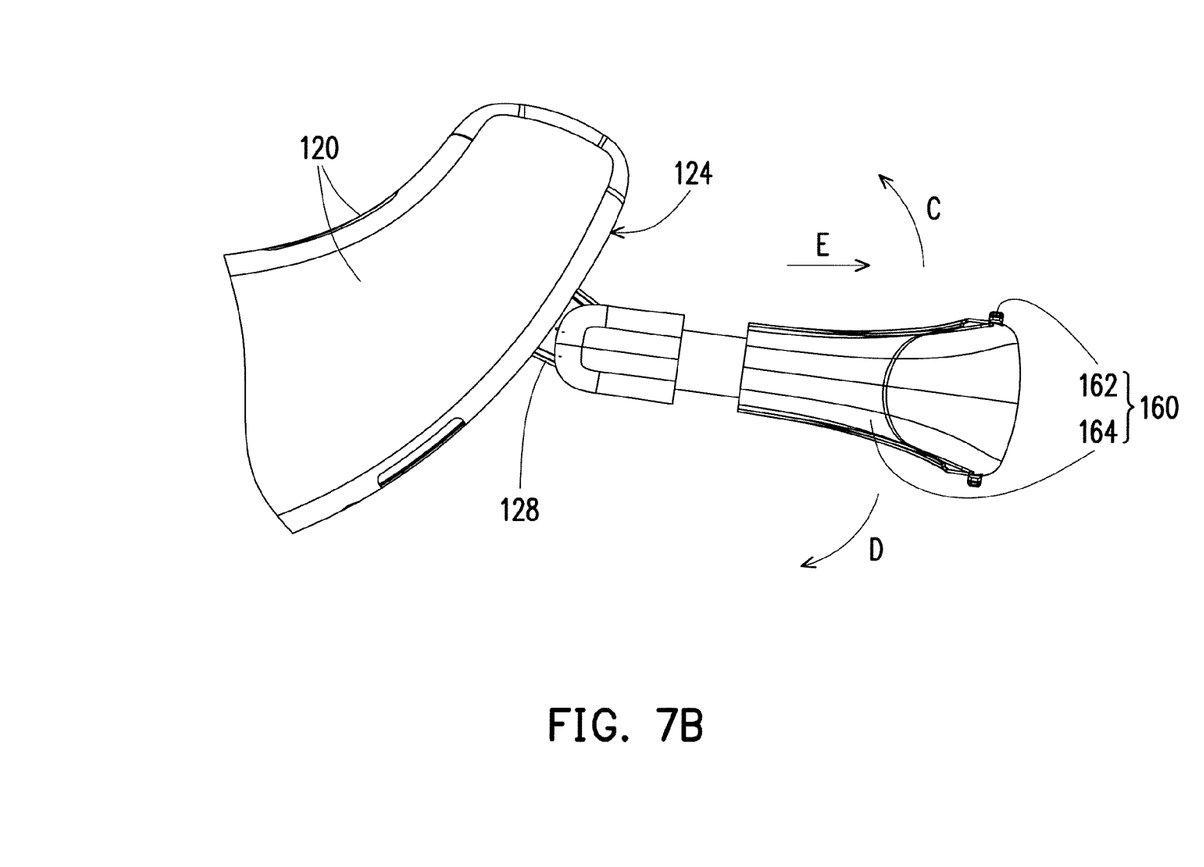
Figure 8:
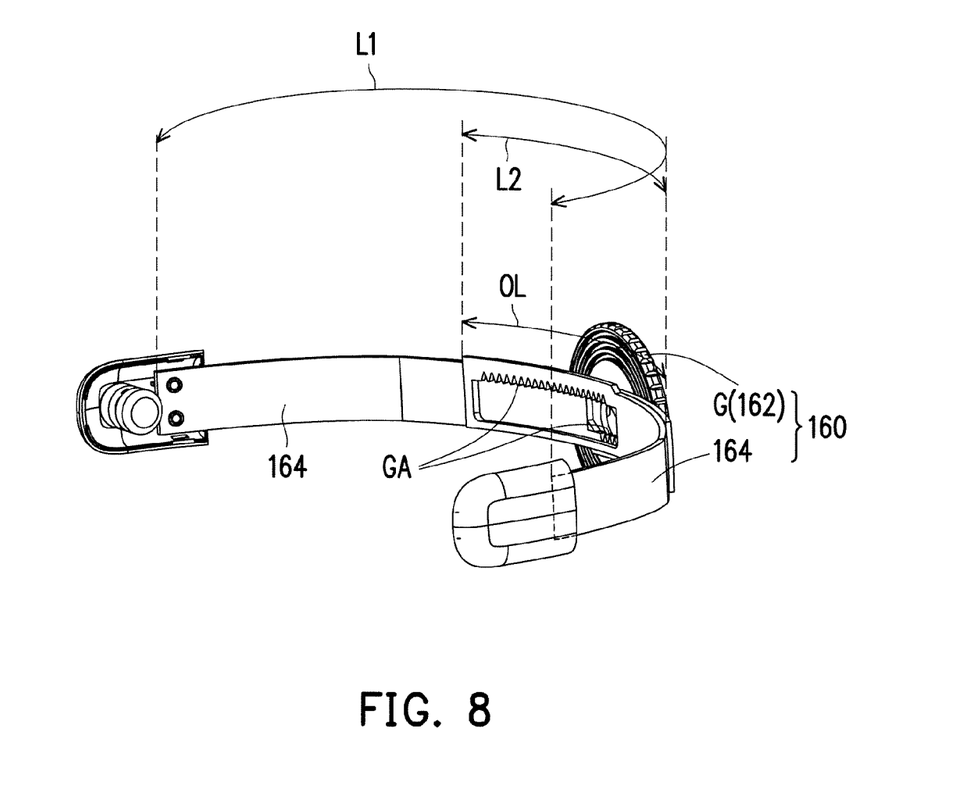
FIG. 8 is a three-dimensional schematic view depicting the back side adjustable fixing member in FIG. 7A with hidden outer case.

FIG. 7A and FIG. 7B are three-dimensional schematic views depicting the back side adjustable fixing member at retracted state and stretched state, respectively. FIG. 8 is a three-dimensional schematic view depicting the back side adjustable fixing member in FIG. 7A with hidden outer case. Referring to FIG. 1, FIG. 2, FIG. 7A, FIG. 7B, and FIG. 8 simultaneously, in the present embodiment, the back side adjustable fixing member 160 includes an adjusting mechanism 162 and two adjusting belts 164, the adjusting belts 164 respectively connect the adjusting mechanism 162 with the second ends 124 of the two corresponding extension members 120. A total length L1 of the back side adjustable fixing member 160 is changed by adjusting the adjusting mechanism 162.

More specifically, in the present embodiment, the adjusting mechanism 162 has a gear G, for example, and the adjusting belts 164 have a gear rack GA, the adjusting mechanism 162 is configured to rotate and drive the two adjusting belts 164 to move with each other, the gear rack GA is coupled to the gear G, and the two adjusting belts 164 overlap each other and form an overlapping region OL. A length L2 of the overlapping region OL is changed by rotating the adjusting mechanism 162, and the total length L1 of the back side adjustable fixing member 160 is changed according to the length L2 of the overlapping region. In other words, when the user rotates the gear G, the two adjusting belts 164 increases or decreases the length L2 of the overlapping region due to function of the gear rack GA and the gear G, so as to adjust the total length L1 of the back side adjustable fixing member 160. As a result, the user can rotate the gear G according to the size of the head 50 of the user so as to adjust the total length L1 of the back side adjustable fixing member 160, so that the back side adjustable fixing member 160 moves in the same direction or the opposite direction with a stretching direction E, the length of the back side adjustable fixing member 160 is changed as shown in FIG. 7A to FIG. 7B. However, in other embodiments, the back side adjustable fixing member 160 may also use a stretching structure to adjust the length L2 of the overlapping region OL of the two adjusting belts 164 along the stretching direction so as to change the total length L1, but the application is not limited thereto.

On the other hand, in the present embodiment, the two adjusting belts 164 are pivotally connected to the second ends 124 of the two corresponding extension members 120, respectively, to make the back side adjustable fixing member 160 rotate with respect to the two extension members 120. Specifically, the two adjusting belts 164 are pivotally connected to the protrusions 128, respectively, by the fixing elements (not shown), such as screws, so that the protrusions 128 serve as pivot points and the user can rotate the back side adjustable fixing member 160 toward the third direction C or the fourth direction D, so as to adjust the position of the back side adjustable fixing member 160 up and down at the back portion 30 of the head 50 of the user. As a result, the head-mounted display device 100 and the head of the user are tightly fit by adjusting the position of the back side adjustable fixing member 160. Simultaneously, the comfort of the user when wearing the head-mounted display device 100 is improved.

Based on the above, the body 110 is fixed on the head 50 of the user by adjusting the top side adjustable fixing member 150 and the back side adjustable fixing member 160. In other words, when the user wears the head-mounted display device 100, the body 110, the two extension members 120, the top side adjustable fixing member 150, and the back side adjustable fixing member 160 lean against the head 50 of the user in four-point contact manner, so as to increase the stability when wearing the head-mounted display device 100.

Summarily, in the embodiments of the application, the body of the head-mounted display device leans against the head of the user through the two extension members and the adjustable fixing member, and thus the body can be tightly fit the head of the user. The two extension members are disposed opposite each other and can be adapted to contact with or depart from the two side portions of the head of the user by rotating with respect to the body, so that the head-mounted display device can lean against the head of the user, so as to improve the comfort in wearing. Otherwise, the user can simply pull and rotate the two extension members to wear or remove the head-mounted display device, so as to improve the convenience of wearing or removing the head-mounted display device.

It will be apparent to those skilled in the art that various modifications and variations can be made to the structure of the invention without departing from the scope or spirit of the invention.

What is claimed is:

1. A head-mounted display device, comprising:
a body, adapted to lean against a front portion of a head of a user;
two extension members, disposed opposite each other, wherein first ends of the two extension members are respectively coupled to two opposite ends of the body and configured to rotate with respect to the body and to lean against two side portions of the head of the user; and
an adjustable fixing member, coupled to second ends of the two extension members and adapted to lean against a back portion or a top portion of the head of the user, wherein the body is configured to be fixed on the head of the user through the two extension members and the adjustable fixing member, wherein the adjustable fixing member comprises:
a top side adjustable fixing member, configured to contact the top portion of the head of the user, and two opposite ends of the top side adjustable fixing member are respectively coupled to the second ends of the two extension members; and
a back side adjustable fixing member, configured to contact the back portion of the head of the user, and two opposite ends of the back side adjustable fixing member are respectively coupled to the second ends of the two extension members, and the body is configured to be fixed on the head of the user by adjusting the top side adjustable fixing member and the back side adjustable fixing member,
wherein each of the two extension members has a plate shape with a first curved edge and a second curved edge opposite to each other, and the first curved edge and the second curved edge are each connected to the first end and the second end of the extension member,
wherein the first ends of the two extension members are wider than the second ends of the two extension members.

2. The head-mounted display device as recited in claim 1, wherein the two extension members are curved and configured to extend from the two opposite ends of the body to above ears of the user.

3. The head-mounted display device as recited in claim 2, wherein the two extension members are curved structures, and an inner arc portion of each of the curved structures is configured to face the top portion of the head of the user.

4. The head-mounted display device as recited in claim 1, further comprising:
two pivot members, respectively connecting the two opposite ends of the body with the first ends of the two extension members, wherein the two extension members are configured to rotate with respect to the body through the two pivot members correspondingly so as to contact with or depart from the two side portions of the head of the user.

5. The head-mounted display device as recited in claim 1, wherein the first ends of the two extension members are respectively coupled to the two opposite ends of the body by screwing.

6. The head-mounted display device as recited in claim 1, wherein the top side adjustable fixing member comprises a bearing belt and two buckles, the buckles respectively connect two opposite ends of the bearing belt with the corresponding extension members, and the bearing belt has an elastic portion.

7. The head-mounted display device as recited in claim 1, wherein the top side adjustable fixing member comprises a bearing belt and two elastic connecting belts, the elastic connecting belts respectively connect two opposite ends of the bearing belt with the second ends of the corresponding extension members.

8. The head-mounted display device as recited in claim 1, wherein the back side adjustable fixing member comprises an adjusting mechanism and two adjusting belts, the adjusting belts respectively connect the adjusting mechanism with the second ends of the corresponding extension members.

9. The head-mounted display device as recited in claim 8, wherein the adjusting mechanism has a gear, each of the adjusting belts has a gear rack coupled to the gear, and the adjusting mechanism is configured to rotate and drive the two adjusting belts to move with each other.

10. The head-mounted display device as recited in claim 8, wherein the adjusting belts are respectively pivotally connected to the second ends of the corresponding extension members, and the back side adjustable fixing member is adapted to rotate with respect to the two extension members.

11. The head-mounted display device as recited in claim 1, wherein the top side adjustable fixing member includes a bearing belt and two buckles.

\* \* \* \* \*